No. 898,318. PATENTED SEPT. 8, 1908.
F. W. CARTER.
AUTOMATIC SAFETY PULLEY LIFT.
APPLICATION FILED JUNE 8, 1907. RENEWED MAY 29, 1908.
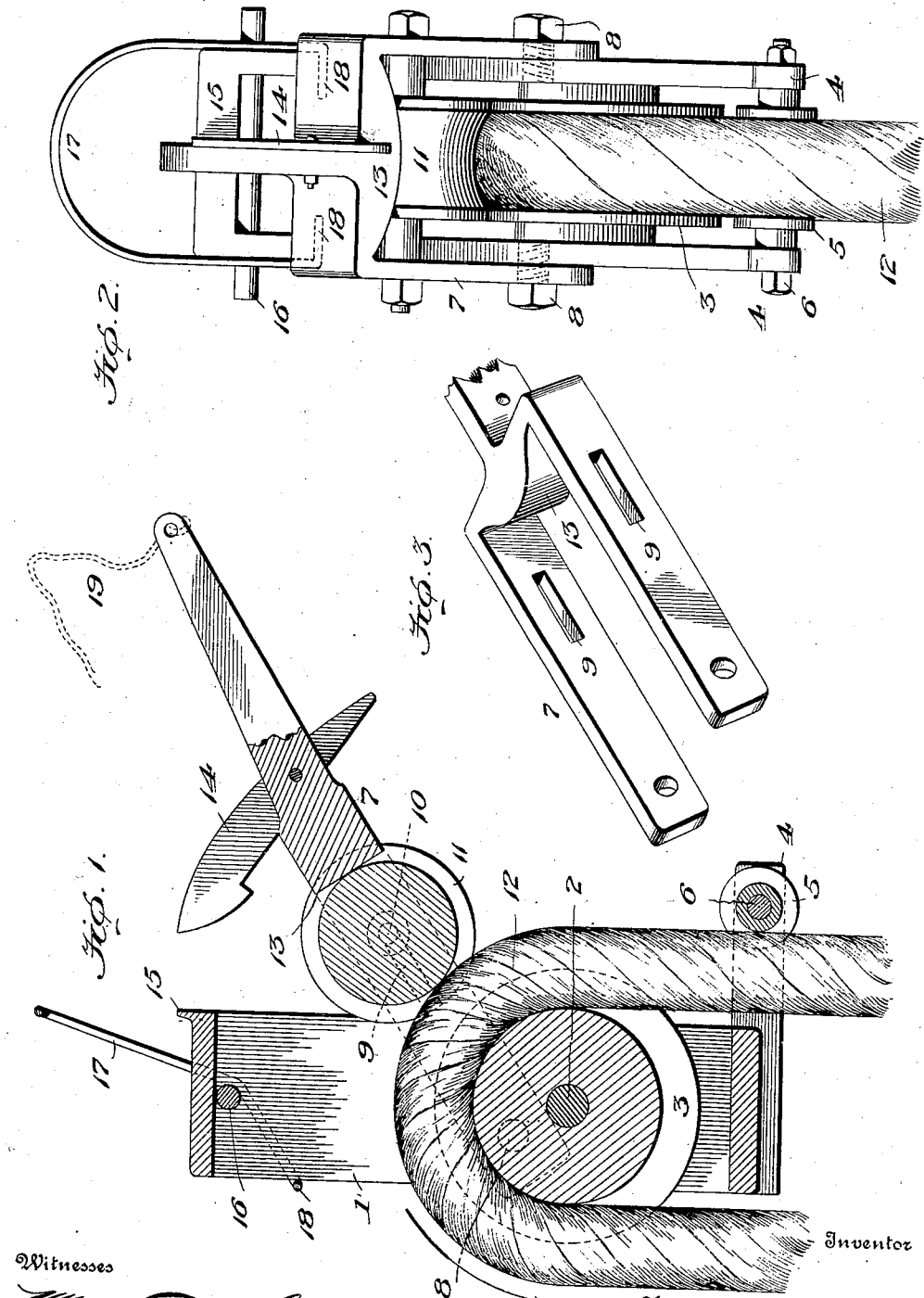

UNITED STATES PATENT OFFICE.

FRANK W. CARTER, OF SAN DIEGO, CALIFORNIA, ASSIGNOR TO AUTOMATIC SAFETY PULLEY BLOCK MANUFACTURING COMPANY, A CORPORATION OF ARIZONA TERRITORY.

AUTOMATIC SAFETY PULLEY-LIFT.

No. 898,318.            Specification of Letters Patent.            Patented Sept. 8, 1908.

Application filed June 8, 1907, Serial No. 377,931. Renewed May 29, 1908. Serial No. 435,694.

*To all whom it may concern:*

Be it known that I, FRANK W. CARTER, a citizen of the United States, residing at San Diego, county of San Diego, and State of California, have invented certain new and useful Improvements in Automatic Safety Pulley-Lifts, of which the following is a specification.

My invention relates to automatic safety pulley lifts.

The object of the present invention is the provision of a safety pulley lift having novel, means for automatically choking or binding the cable or rope when it tends to draw in the opposite direction to its usual course of travel, which may be readily released, held in inoperative position, and operated when the pulley lift is out of reach, and a further object is to provide improved means for guiding the cable and for suspending the pulley lift.

The present invention is intended to overcome the defects heretofore incident to the use of pulley blocks having automatic choking arrangements by eliminating the possibility of the choking device becoming so wedged on the cable that it cannot be readily released, and otherwise to cure the defective manner of suspension of the devices guiding the cable heretofore incident in devices of this character, as also to simplify, cheapen, and lighten the construction.

The invention is set forth fully hereinafter and the novel features are recited in the appended claims.

In the accompanying drawings:—Figure 1 is a sectional elevation; Fig. 2 is an edge view looking toward the right of Fig. 1; and Fig. 3 is a perspective detail of the choke-sheave carrier.

The frame or loop 1 may assume different forms according as cast iron or wrought iron is used and I do not restrict myself to the particular construction herein set forth. The loop is provided with a bolt axle 2 for the cable or rope sheave 3. When the device is used with an ordinary cable, this sheave will have a round groove, but if used with a wire cable, the groove may be V-shaped. The loop is provided with a cable-guide consisting of the extension 4 between which is a grooved idle guide roller 5 pivoted on a bolt 6.

There is a choke-sheave carrier 7 made in the shape of a fork which straddles the loop 1 and is pivoted to the sides thereof eccentrically in relation to the sheave-bolt 2. The manner of pivoting may be accomplished in different ways. In the present instance, thumb screws 8 passing through holes in the sides of the fork 7 and screwed into the loop 1, are used. If desired, a pivot-lug could be cast integral with one of the members of fork 7 and a screw like 8 be used at the other side, instead of using two screws, in which case, the lug would be made to snap into a hole in the loop 1, corresponding to the threaded opening receiving the thumb screw 8, which would then be located on the opposite side. Flashings may be employed on loop 1 around the bolt 2. Slots 9 are provided in the sides of the fork 7 and extend longitudinally thereof, the same receiving a pivot-bolt 10, which carries a choke-sheave 11, the latter being adapted to bind on the cable 12 when the choke-sheave carrier is drawn downwardly. The choke-sheave carrier has a cross-piece bridging its forks which is provided with a rounded shoe 13 of a conformation corresponding to that of the choke-sheave and against which the choke-sheave is forced when carrying out the choking function. A pivoted catch 14 is carried by the handle of the choke-sheave carrier and is adapted to engage a keeper 15 on the loop 1. According as the loop 1 is cast or wrought, the keeper 15 may be integral with said loop or formed separately therefrom.

Extending crosswise of the loop 1 at the upper part thereof is a bolt 16, but lugs may take the place of this bolt. A clevis 17 takes under the ends of the bolt 16 and has its ends 18 engaged with the loop 1. This clevis affords means for suspending the device. In substitution for the clevis, there may be employed a wrought iron hook swiveled to the loop.

The handle of the choke-sheave carrier may be provided with a cord 19 which can pass over a pulley suspended above the safety-lift so that the choke-sheave carrier may be conveniently raised or lowered when the safety lift is positioned out of reach. In this instance, the latching device 14—15 will be dispensed with.

Normally the cable is running over the sheave 3, the choke-sheave 11 turning idly and its bolt 10 playing back and forth in the slots 9, but immediately the cable attempts to slip backwardly in the opposite direction to its usual course of travel, the eccentric pivoting of the choke-sheave carrier in relation to the sheave 3 causes the choke-sheave to bind upon the cable and the entire choke-sheave carrier to be drawn downwardly, which forces the choke-sheave 11 against the face 13, thereby exerting a powerful frictional contact or braking action and preventing slippage of the cable. This braking action is due both to the engagement of the surface 13 with choke-sheave 11 and the fact that the choke-sheave carrier is eccentrically pivoted in relation to the choke-sheave pivot.

When the choke-sheave carrier is held in raised position (either by the latch or by the cord) the cable can run freely in both directions without any choking action. The provision of the guide for the cable prevents displacement of the latter and keeps it always in proper position for coöperation therewith of the choke-sheave, while the roller 5 practically eliminates friction at this point. By providing a clevis which has its point of suspension from above off-set in relation to the device, the latter hangs vertically instead of in a tilted position.

Having thus described my invention, what I claim as new and desire to secure by Letters Patent, is:—

1. In an automatic safety pulley lift, the combination with a frame, and a cable-sheave carried thereby, of a choke-sheave carrier eccentrically pivoted in relation to the cable-sheave, and a choke-sheave carried by said carrier and also movable in relation to said carrier.

2. In an automatic safety pulley lift, the combination with a frame, and a cable-sheave carried thereby, of a choke-sheave carrier eccentrically pivoted in relation to the cable-sheave, a choke-sheave carried by said carrier and also movable in relation to said carrier, and means on the choke-sheave carrier adapted to engage the choke-sheave when it is shifted by engagement with the cable to thereby exert a braking action on said choke-sheave.

3. In an automatic safety pulley lift, the combination with a frame, and a cable-sheave carried thereby, of a choke-sheave carrier pivoted to the frame, a choke-sheave carried by the choke-sheave carrier, and braking means carried by said choke-sheave carrier adapted to engage the choke-sheave.

4. In an automatic safety pulley lift, the combination with a frame, and a cable-sheave carried thereby, of a choke-sheave carrier pivoted to the frame, a choke-sheave carried by and movable in relation to said choke-sheave carrier, and means carried by the choke-sheave carrier for exerting a braking action on said choke-sheave.

5. In an automatic safety pulley lift, the combination with a frame, of a cable-sheave carried thereby, a choke-sheave carrier pivoted to the frame eccentrically in relation to the cable-sheave, a choke-sheave carried by said carrier, and means for securing the choke-sheave carrier in inoperative position.

In testimony whereof, I hereunto affix my signature in presence of two witnesses.

FRANK W. CARTER.

Witnesses:
PATTERSON SPRIGG,
L. V. REAMES.